United States Patent Office 3,068,209
Patented Dec. 11, 1962

3,068,209
PREPARATION OF RESINOUS MATERIALS
Edward M. Geiser, Downers Grove, Ill., assignor to Universal Oil Products Company, Des Plaines, Ill., a corporation of Delaware
No Drawing. Filed Apr. 15, 1959, Ser. No. 806,435
16 Claims. (Cl. 260—78.4)

This application is a continuation-in-part of my copending application Serial No. 553,203, filed December 15, 1955, which is a continuation-in-part of my application Serial No. 466,209, filed November 1, 1954, both said earlier applications being now abandoned.

This invention relates to new compositions of matter and particularly to high molecular weight resinous compositions which are prepared by copolymerizing a heterocyclic compound with an adduct of a conjunct polymer oil and an unsaturated ester of an unsaturated dibasic acid.

It is an object of this invention to prepare a resinous material which may be used to produce hard surface coatings.

A more particular object of this invention is to effect the copolymerization of a heterocyclic compound with the adduct of a conjunct polymer oil and an unsaturated ester of an unsaturated dibasic acid to prepare high molecular weight resinuous compositions which may be used as protective coatings or in manufacturing molded objects.

One embodiment of the invention is found in a process for the preparation of a resinuous product which comprises condensing a heterocyclic compound containing from 2 to 3 carbon atoms in the ring, the hetero atom being selected from the group consisting of oxygen, sulfur and nitrogen, atoms, with an adduct of a conjunct polymer oil, said oil comprising cycloolefins having an average of from 2 to 4 double bonds per molecule and having a molecular weight of from about 250 to about 400, a specific gravity of from about 0.8 to about 0.9, maleic anhydride values of from about 30 to about 90 and bromine numbers from about 130 to about 175, and an unsaturated ester of an unsaturated dibasic acid containing from about 6 to about 18 carbon atoms, said ester containing only carbon, hydrogen and oxygen atoms, at a temperature in the range of from about −50° to about 100° C. to effect multiple condensations between said adduct and said heterocyclic compounds.

A further embodiment of the invention resides in a process for the preparation of a resinous product which comprises condensing a heterocyclic compound containing from 2 to 3 carbon atoms in the ring, the hetero atom being selected from the group consisting of oxygen, sulfur and nitrogen atoms, with an adduct of a conjunct polymer oil, said oil comprising cycloolefins having an average of from 2 to 4 double bonds per molecule and having a molecular weight of from about 250 to about 400, a specific gravity of from about 0.8 to about 0.9, maleic anhydride values of from about 30 to about 90 and bromine numbers from about 130 to about 175, in an unsaturated ester of an unsaturated dibasic acid containing from about 6 to about 18 carbon atoms, said esters containing only carbon, hydrogen and oxygen atoms, said conjunct polymer oil and said ester being present in about a 1:1 mol ratio, said heterocyclic compound and said adduct being present in from about a 1:1 mol ratio to about a 10:1 mol ratio of said adduct to said heterocyclic compound, at a temperature in the range of from about −50° to about +100° C. to effect multiple condensations between said adduct and said heterocyclic compound.

A specific embodiment of the invention is found in a process for the preparation of a resinous compound which comprises condensing ethylene imine with a diallyl maleate adduct of a conjunct polymer oil, said conjunct polymer oil comprising cycloolefins having an average of from 2 to 4 double bonds per molecule and having a molecular weight of from about 250 to about 400, a specific gravity of from about 0.8 to about 0.9, maleic anhydride values of from about 30 to about 90 and a bromine number of from about 130 to about 175, said conjunct polymer oil and said diallyl maleate being present in about a 1:1 mol ratio and said adduct and said ethylene imine being present in about a 1:1 mol ratio to about a 10:1 mol ratio of said adduct to said ethylene imine at a temperature in the range of from about 40° to about 50° C. in the presence of a catalyst comprising a boron trifluoride-ethyl ether complex, to effect multiple condensations between said diallyl maleate adduct and said ethylene imine.

Other objects and embodiments referring to alternative adducts of conjunct polymer oils and unsaturated esters of unsaturated dibasic acids, and to alternative heterocyclic compounds will be set forth in the following further detailed description of the invention.

It has now been discovered that new compositions of matter in the form of resinous materials may be obtained by copolymerizing a heterocyclic compound containing two to three carbon atoms in the ring with an adduct of a conjunct polymer oil and an unsaturated ester of an unsaturated dibasic acid. The compounds prepared according to the process of this invention are suitable for wide variety of uses, said uses including among other things hard surface coatings, as compounds which may be formed into molded objects or products, or as intermediates in the preparation of other plastic materials.

Heterocyclic compounds containing from two to three carbon atoms, and not more than a total of four atoms, including the hetero atoms said hetero atoms being selected from the group consisting of oxygen, sulfur and nitrogen atoms, in the ring, which may be used in the process of this invention include ethylene imine, ethylene epoxide, ethylene episulfide, 1,2-propylene imine, 1,2-propylene epoxide, 1,2-propylene episulfide, 1,3-propylene imine, 1,3-propylene epoxide, 1,2-propylene episulfide, etc.

The adducts which are copolymerized with the aforementioned compounds are adducts of unsaturated esters of unsaturated dibasic acids with conjunct polymer oils, said oils comprising hydrocarbons which have been recovered from the catalyst complex formed in hydrocarbon reaction involving catalysts capable of conjunct polymerization such as Friedel-Crafts type halides of the aluminum chloride type, sulfuric acid, hydrogen fluoride, etc. The preparation of these conjunct polymer oils and their physical characteristics are described in United States Patent No. 2,518,519. These conjunct polymer oils are characterized by high degrees of unsaturation both isolated and conjugated and normally comprise cycloolefins having an average of two to four double bonds per mole. The cyclic portion of the oils has a cyclopentyl structure in which the olefin bond of the cyclopentene ring is in conjugation with an olefinic bond present in an alkenyl or alkapolyenyl side chain. The individual hydrocarbons are cyclic in nature, although substantially non-aromatic, having isolated unsaturation in addition to conjugated unsaturation, the four carbon atoms which constitute the conjugated system being highly substituted, possessing, on the average, fewer than two hydrogen atoms as substituents. Such conjunct polymer oils usually have a boiling range of from about 150° to over 450° C., a molecular weight ranging from about 250 to about 400, although some components may have molecular weights up to 1000, specific gravities ranging from about 0.8 to about 0.9, maleic anhydride values of from about 30 to about 90 and bromine numbers ranging from about 130 to about 175.

Examples of unsaturated esters of unsaturated dibasic acids containing from about 6 to about 18 carbon atoms, said ester containing only carbon, hydrogen and oxygen atoms, which are condensed with said oils include monovinyl maleate, divinyl maleate, monoallyl maleate, diallyl maleate, monovinyl fumarate, divinyl fumarate, monoallyl fumarate, diallyl fumarate, monovinyl itaconate, divinyl itaconate, monoallyl itaconate, diallyl itaconate, monovinyl citraconate, divinyl citraconate, monoallyl citraconate, diallyl citraconate, monovinyl mesaconate, divinyl mesaconate, monoallyl mesaconate, diallyl mesaconate, monovinyl glutaconate, divinyl glutaconate, monoallyl glutaconate, diallyl glutaconate, monovinyl muconate, divinyl muconate, monoallyl muconate, diallyl muconate, etc. When forming the adduct of the conjunct polymer oil and the unsaturated ester of an unsaturated dibasic acid the reactants are preferably condensed using equimolecular proportions thereof, thus having a 1:1 mol ratio of oil to ester present. It is to be understood that the aforementioned compounds are merely examples of conjunct polymer oils and unsaturated esters of unsaturated dibasic acids which may be used, and that the process of the present invention is not necessarily limited thereto.

The process of the present invention is carried out at reaction conditions which are sufficient to cause the heterocyclic compound containing two to three carbon atoms in the ring to decyclize and to form an olefinic analogue thereof, and thereafter at the same reaction conditions, to cause multiple condensations of the adducts of conjunct polymer oils and an unsaturated ester of an unsaturated dibasic acid, and olefinic analogue of the heterocyclic compound. The aforementioned reaction is usually carried out at a temperature in the range of from about $-50°$ to about $+100°$ C., while generally maintaining the reaction mixture at a pressure sufficient to keep a substantial portion of the mixture in a liquid state.

If so desired, the copolymerization of the heterocyclic compound containing two to three carbon atoms in the ring with the adduct of a conjunct polymer oil and an unsaturated ester of an unsaturated dibasic acid may be carried out in the presence of a catalyst of the Friedel-Crafts metal halide type, examples of which include aluminum chloride, ferric chloride, bismuth chloride, zinc chloride, etc. For purposes of this invention boron trifluoride is considered as a metal halide falling within the class of the above defined Friedel-Crafts type catalysts. A preferred catalyst in the process of this invention comprises a metal halide-etherate complex such as a boron trifluoride-ethyl ether complex.

When employing relatively active catalysts such as aluminum chloride, ferric chloride, boron trifluoride-ethyl ether complexes, etc., lower operating temperatures within the above indicated limits are generally preferred inasmuch as these catalysts have a relatively high activity, particularly in the presence of hydrogen chloride or hydrogen bromide which are sometimes used simultaneously with a metal halide catalyst. When a less active catalyst such as bismuth chloride or zinc chloride is used, somewhat higher temperatures in the range of from $0°$ to about $+100°$ C. are preferred.

The process of this invention may be effected in any suitable manner and may comprise either a batch or a continuous type operation. When a batch type operation is used, a quantity of the starting material, namely, the heterocyclic compound and the adduct of a conjunct polymer oil and an unsaturated ester of an unsaturated dibasic acid along with the catalyst, if one is used, is placed in a suitable reaction vessel such as a rotating autoclave. The vessel is then cooled or heated to the desired temperature range for a predetermined time, satisfactory conditions of time and temperature, as hereinbefore stated, depending upon the reactants, and catalyst if any, which are used. Upon completion, the desired product is separated from the catalyst, if used, and from any unreacted starting materials, and recovered therefrom by conventional means, for example, fractional distillation, crystallization, etc.

Another method of operation of the present process is of the continuous type. In this method the starting materials comprising the adduct of a conjunct polymer oil and an unsaturated ester of an unsaturated dibasic acid, and the heterocyclic compound, are continuously charged to a reactor maintained at suitable operating conditions of temperature and pressure. The reactor may comprise an unpacked vessel or coil or may contain an adsorbent packing material such as alumina, fire brick, dehydrated bauxite and the like. The starting materials may be continuously charged to this reactor through separate means or, if so desired, may be admixed prior to introduction into the reactor and charged thereto in a single stream. Likewise, if the catalyst to be used in this reaction is a solid, as for example, aluminum chloride, it may be placed in the reactor as a solid bed, or if it is in gaseous or liquid form such as the boron trifluoride-ethyl ether complex, it may be charged to the reactor through a separate means. After a predetermined residence time has elapsed the copolymerization product is withdrawn and separated from the reactor effluent while the unconverted adduct and heterocyclic compound may be recycled for further use as a portion of the feed stock. If the more active catalysts such as those hereinbefore enumerated are employed at relatively high operating temperatures in the above indicated range, for example, about $+30°$ to about $+100°$ C. the charge rate of the reaction mixture is maintained at a sufficient space velocity to quickly remove the reaction product from the catalyst zone, thereby avoiding undesirable decomposition reactions. Likewise, when the less active catalysts are used within the lower temperatures of the indicated operating range, the reaction must be prolonged in order to obtain substantial condensation products of the reaction. The reactants may be charged to the reactor at a liquid hourly space velocity (the volume of liquid charge in relation to the volume of solid catalyst in the reaction zone) ranging from about 10 to about 500 depending upon the catalyst and temperatures utilized in the reaction. When using the lower space velocities hereinbefore set forth, an inert solvent comprising a high boiling paraffin such as heptane or an aromatic hydrocarbon such as benzene, toluene, etc., is usually present in the reactor. As hereinbefore indicated, the particular temperature which is used for the copolymerization reaction of this invention will depend upon the particular reactants undergoing polymerization as well as the catalyst, if any, which is used.

A particularly suitable type of operation when using a solid metal halide catalyst of the type hereinbefore described comprises a fixed bed type in which the desired catalyst is disposed as a bed in the reaction zone and the reactants are passed therethrough in either an upward or downward flow. When utilizing this process a solvent of the type hereinbefore described will be needed to prevent a pressure build-up due to the tendency of the resinous product to remain on the solid catalyst. Other continuous types of process, under suitable operating conditions of temperature and pressure, may include a fluidized bed type operation in which the aforementioned adduct and heterocyclic compound along with the solid catalyst, are maintained in a state of turbulence under hindered settling conditions in the reaction zone; the compact moving bed type of operation in which the reactants and catalysts pass either concurrently or countercurrently to each other; and the slurry type process in which the catalyst is carried into the reaction zone as a slurry in the heterocyclic compound. In each of the aforementioned types of processes the unreacted materials are separated out and recycled for use as a portion of the feed stock while the desired copolymers are withdrawn and separated from any by-products which may be formed during the reaction.

It is to be understood when using the preferred catalyst of the present invention, that is, a boron fluoride-etherate complex the above enumerated types of processes are not applicable inasmuch as said catalyst is not a solid.

The reactants will be present in the reaction mixture in amounts ranging from a 1:1 ratio of the adduct of a conjunct polymer oil and an unsaturated ester of an unsaturated dibasic acid to heterocyclic compound up to about a 10:1 ratio of adduct to heterocyclic compound. In addition, the catalyst, if used, is present in an amount ranging from about 0.1 to about 10% by weight of the combined adduct-heterocyclic compound mixture.

The following examples are given to illustrate the process of this invention which, however, are not intended to limit the generally broad scope of the present invention in strict accordance therewith.

Example I

Approximately equal molecular proportions of a diallyl maleate adduct of a conjunct polymer oil boiling at 325° C. and ethylene imine were placed in a reaction vessel at room temperature along with approximately 5% by weight of a boron trifluoride-ethyl ether complex catalyst. The preparation of such an adduct is described in the aforementioned Patent No. 2,518,519. The conjunct polymer oil used in this adduct had a molecular weight of approximately 290, a bromine number of 165, a specific gravity of 0.864 and a refractive index of 1.4839. No reaction occurred until the temperature of the mixture was increased to approximately 50° C., at which point copolymerization of the diallyl maleate adduct and ethylene imine occurred. The polymer was separated from unreacted starting material and consisted of a soft, yellow, semi-solid mass which, when mixed with a conventional metallic dryer, dried in a short period of time to give a tack-free hard surface coating.

Example II

Approximately equal molecular proportions of a divinyl fumarate adduct of a conjunct polymer oil and ethylene imine are placed in a reaction vessel which is then heated to a temperature of approximately 80° C. The divinyl fumarate adduct and the ethylene imine copolymerize to give a soft, semi-solid mass which may be mixed with conventional metallic dryers to give a hard surface coating when said material is spread in a thin film on the surface to be treated.

Example III

Approximately equal molecular proportions of a diallyl muconate adduct of a conjunct polymer oil and ethylene imine are admixed in a reaction vessel at room temperature. Approximately 5% by weight of a boron trifluoride-ethyl ether complex is added thereto, after which the mixture is stirred and heated to a temperature in the range of from about 40° to about 50° C. The diallyl muconate adduct and ethylene imine copolymerize to give a soft semi-solid mass which, after being mixed with a conventional metallic dryer will dry to give a tack-free surface coating.

Example IV

In this example approximately equal molecular proportions of a divinyl maleate adduct of a conjunct polymer oil and propylene imine are admixed in a suitable reaction vessel at room temperature along with a boron trifluoride-ethyl ether complex catalyst. The reaction vessel is then heated to a temperature of about 45° C. and maintained thereat for a period of about 4 hours. At the end of this time the reaction mixture is allowed to cool to room temperature and the divinyl maleate adduct-propylene imine polymer comprising a soft semi-solid mass is separated from the unreacted starting materials, said polymer after being mixed with a conventional metallic drier will dry to give a tack-free surface coating.

Example V

The process in the above examples is repeated by condensing equal molecular proportions of ethylene oxide with a diallyl maleate adduct of a conjunct polymer oil at a temperature of about 50° C. in the presence of a boron trifluoride-ethyl ether complex. The resultant polymer will comprise a soft semi-solid mass which, after admixture with a conventional drier, will dry to give a tack-free surface coating.

I claim as my invention:

1. A process for the preparation of a resinous product which comprises condensing a heterocyclic compound selected from the group consisting of ethylene imine, ethylene epoxide, ethylene episulfide, 1,2-propylene imine, 1,2-propylene epoxide, 1,2-propylene episulfide, 1,3-propylene imine, 1,3-propylene epoxide, and 1,3-propylene episulfide, with an adduct of a conjunct polymer oil, said oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and bromine numbers from about 130 to about 175, and an unsaturated ester of an unsaturated dibasic acid containing from about 6 to about 18 carbon atoms, said ester containing only carbon, hydrogen and oxygen atoms, at a temperature in the range of from about −50° to about +100° C.

2. A process for the preparation of a resinous product which comprises condensing a heterocyclic compound selected from the group consisting of ethylene imine, ethylene epoxide, ethylene episulfide, 1,2-propylene imine, 1,2-propylene epoxide, 1,2-propylene episulfide, 1,3-propylene imine, 1,3-propylene epoxide, and 1,3-propylene episulfide, with an adduct of a conjunct polymer oil, said oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and bromine numbers from about 130 to about 175, and an unsaturated ester of an unsaturated dibasic acid containing from about 6 to about 18 carbon atoms, said ester containing only carbon, hydrogen and oxygen atoms, said conjunct polymer oil and said ester being present in about a 1:1 mol ratio, at a temperature in the range of from about −50° to about +100° C.

3. A process as set forth in claim 1 further characterized in that said condensation is effected in the presence of a catalyst comprising a Friedel-Crafts metal halide-etherate complex.

4. A process for the preparation of a resinous product which comprises condensing ethylene imine with an adduct of a conjunct polymer oil, said oil comprising cycloolefins having an average of from 2 to 4 double bonds per molecule and having a molecular weight of from about 250 to about 400, a specific gravity of from about 0.8 to 0.9, maleic anhydride values of from about 30 to about 90, and a bromine number of from about 130 to about 175, and an unsaturated ester of an unsaturated dibasic acid containing from about 6 to about 18 carbon atoms, said ester containing only carbon, hydrogen and oxygen atoms, said conjunct polymer oil and said ester being present in about a 1:1 mol ratio, said adduct and said ethylene imine being present in from about a 1:1 mol ratio to about a 10:1 mol ratio of said adduct to said ethylene imine, at a temperature in the range of from about −50° to about +100° C. in the presence of a catalyst comprising a Friedel-Crafts metal halide-etherate complex.

5. A process as set forth in claim 1 further characterized in that said heterocyclic compound comprises propylene imine.

6. A process as set forth in claim 1 further characterized in that said heterocyclic compound comprises ethylene oxide.

7. A process as set forth in claim 1 further characterized in that said heterocyclic compound comprises ethylene episulfide.

8. A process as set forth in claim 1 further characterized in that said unsaturated ester of an unsaturated dibasic acid comprises divinyl fumarate.

9. The process set forth in claim 1 further characterized in that said unsaturated ester of an unsaturated dibasic acid comprises diallyl maleate.

10. The process set forth in claim 1 further characterized in that said unsaturated ester of an unsaturated dibasic acid comprises diallyl muconate.

11. The process set forth in claim 1 further characterized in that said unsaturated ester of an unsaturated dibasic acid comprises divinyl maleate.

12. A process for the preparation of a resinous product which comprises condensing ethylene imine with a diallyl maleate adduct of a conjunct polymer oil, said conjunct polymer oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and a bromine number of from about 130 to about 175, said conjunct polymer oil and said diallyl maleate being present in about a 1:1 mol ratio and said adduct and said ethylene imine being present in from about a 1:1 mol ratio to about a 10:1 mol ratio of said adduct to said ethylene imine, at a temperature in the range of from about 40° to about 50° C. in the presence of a catalyst comprising a boron trifluoride-ethyl ether complex.

13. A process for the preparation of a resinous product which comprises condensing ethylene imine with a diallyl muconate adduct of a conjunct polymer oil, said conjunct polymer oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and a bromine number of from about 130 to about 175, said conjunct polymer oil and said diallyl muconate being present in about a 1:1 mol ratio and said adduct and said ethylene imine being present in from about a 1:1 mol ratio to about a 10:1 mol ratio of said adduct to said ethylene imine, at a temperature in the range of from about 40° to about 50° C. in the presence of a catalyst comprising a boron trifluoride-ethyl ether complex.

14. A process for the preparation of a resinous product which comprises condensing ethylene imine with a divinyl fumarate adduct of a conjunct polymer oil, said conjunct polymer oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and a bromine number of from about 130 to about 175, said conjunct polymer oil and said divinyl fumarate being present in about a 1:1 mol ratio and said adduct and said ethylene imine being present in from about a 1:1 mol ratio to about a 10:1 mol ratio of said adduct to said ethylene imine, at a temperature in the range of from about 40° to about 50° C. in the presence of a catalyst comprising a boron trifluoride-ethyl ether complex.

15. A process for the preparation of a resinous product which comprises condensing propylene imine with a divinyl maleate adduct of a conjunct polymer oil, said conjunct polymer oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and a bromine number of from about 130 to about 175, said conjunct polymer oil and said divinyl maleate being present in about a 1:1 mol ratio and said adduct and said propylene imine being present in from about a 1:1 mol ratio to about a 10:1 mol ratio of said adduct to said propylene imine, at a temperature in the range of from about 40° to about 50° C. in the presence of a catalyst comprising a boron trifluoride-ethyl ether complex.

16. A process for the preparation of a resinous product which comprises condensing ethylene oxide with a diallyl maleate adduct of a conjunct polymer oil, said conjunct polymer oil comprising cycloolefins having an average of from 2 to 4 double bonds per molecule and having a molecular weight of from about 250 to about 400, a specific gravity of from about 0.8 to about 0.9, maleic anhydride values of from about 30 to about 90, and a bromine number of from about 130 to about 175, said conjunct polymer oil and said diallyl maleate being present in about a 1:1 mol ratio and said adduct and said ethylene oxide being present in from about a 1:1 mol ratio to about a 10:1 mol ratio of said adduct to said ethylene oxide, at a temperature in the range of from about 40° to about 50° C. in the presence of a catalyst comprising a boron trifluoride-ethyl ether complex.

References Cited in the file of this patent

UNITED STATES PATENTS

| | | |
|---|---|---|
| 2,518,519 | Bloch | Aug. 15, 1950 |
| 2,626,931 | Bestian | Jan. 27, 1953 |
| 2,729,623 | Gregg | Jan. 3, 1956 |
| 2,826,562 | Shokal | Mar. 11, 1958 |